United States Patent
Deng

(10) Patent No.: US 12,183,217 B2
(45) Date of Patent: Dec. 31, 2024

(54) LANGUAGE LEARNING METHOD, ELECTRONIC DEVICE EXECUTING THE METHOD, AND STORAGE MEDIUM STORING THE METHOD PROGRAM FILES

(71) Applicant: Guangdong Zhimeiyuntu Tech. Corp., Ltd., Guangzhou (CN)

(72) Inventor: Libang Deng, Guangzhou (CN)

(73) Assignee: GUANGDONG ZHIMEIYUNTU TECH. CORP., LTD., Guangzhou (CN)

( * ) Notice: Subject to any disclaimer, the term of this patent is extended or adjusted under 35 U.S.C. 154(b) by 966 days.

(21) Appl. No.: 17/198,331

(22) Filed: Mar. 11, 2021

(65) Prior Publication Data
US 2021/0201697 A1  Jul. 1, 2021

Related U.S. Application Data

(63) Continuation-in-part of application No. PCT/CN2018/111416, filed on Oct. 23, 2018.

(30) Foreign Application Priority Data

Sep. 11, 2018 (CN) .......................... 201811056994.3

(51) Int. Cl.
| | | |
|---|---|---|
| G09B 5/04 | (2006.01) | |
| G06F 3/16 | (2006.01) | |
| G06F 18/21 | (2023.01) | |
| G06N 3/08 | (2023.01) | |
| G06V 10/764 | (2022.01) | |
| G06V 10/82 | (2022.01) | |
| G06V 20/20 | (2022.01) | |
| G09B 7/04 | (2006.01) | |
| G09B 19/06 | (2006.01) | |

(52) U.S. Cl.
CPC ............... *G09B 5/04* (2013.01); *G06F 3/167* (2013.01); *G06F 18/21* (2023.01); *G06N 3/08* (2013.01); *G06V 10/764* (2022.01); *G06V 10/82* (2022.01); *G06V 20/20* (2022.01); *G09B 7/04* (2013.01); *G09B 19/06* (2013.01)

(58) Field of Classification Search
CPC ...................................................... G09B 5/04
See application file for complete search history.

*Primary Examiner* — Kesha Frisby
(74) *Attorney, Agent, or Firm* — MATTHIAS SCHOLL P.C.; Matthias Scholl

(57) ABSTRACT

The disclosure provides a language learning method including task feedback and image check. The task feedback includes playing, by a sound module according to a learning instruction, the vocal content of a word, and taking, by a user, an object image corresponding to the word through a camera module of a terminal device. The image check includes receiving, by a processor module, the object image; identifying the object image according to a preestablished identification model; acquiring an identification result and comparing the identification result with the word; judging whether the object image taken by the user is correct; and feeding back, by a display module or the sound module, a judgment result.

8 Claims, 1 Drawing Sheet

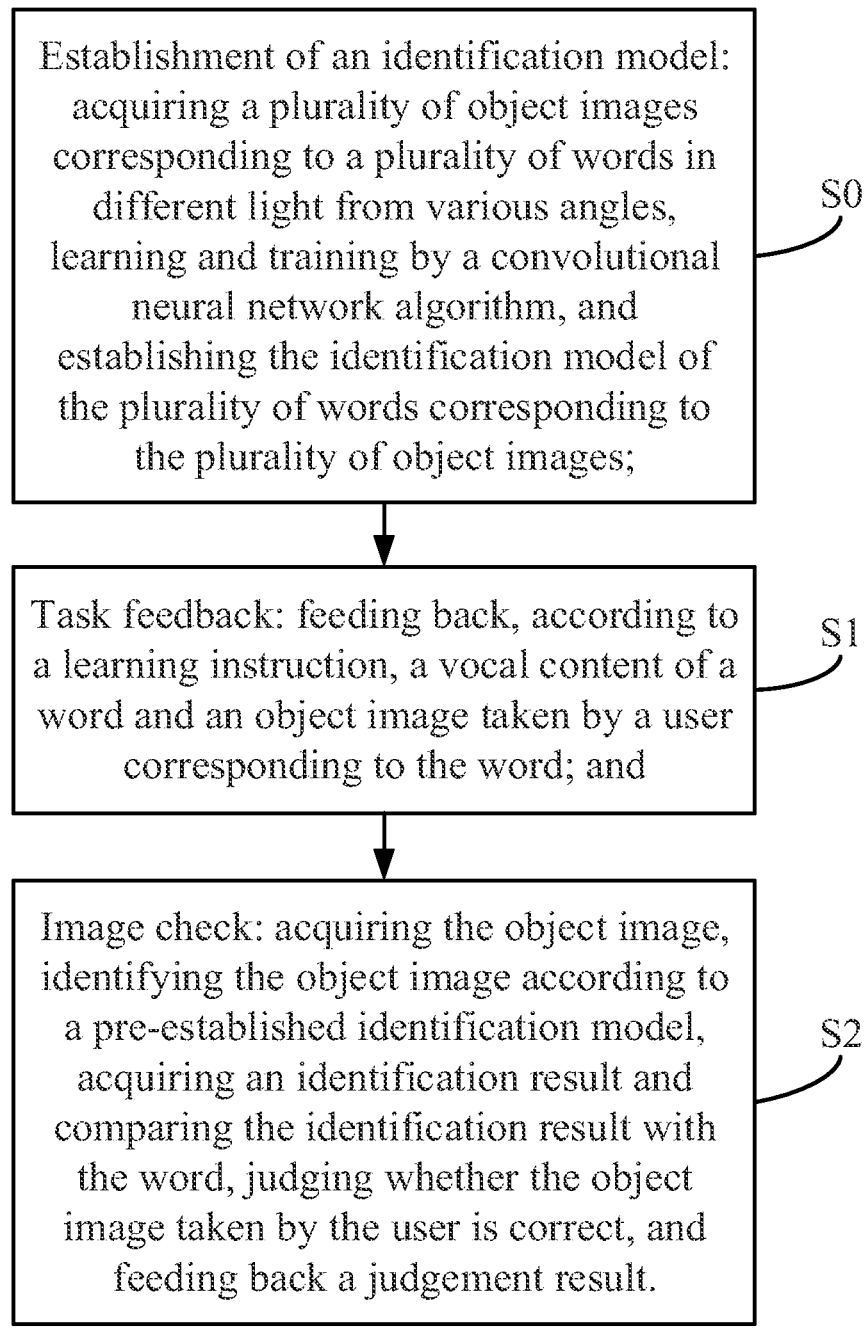

LANGUAGE LEARNING METHOD, ELECTRONIC DEVICE EXECUTING THE METHOD, AND STORAGE MEDIUM STORING THE METHOD PROGRAM FILES

CROSS-REFERENCE TO RELATED APPLICATIONS

This application is a continuation-in-part of International Patent Application No. PCT/CN2018/111416 with an international filing date of Oct. 23, 2018, designating the United States, and further claims foreign priority benefits to Chinese Patent Application No. 201811056994.3 filed on Sep. 11, 2018. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to the field of image recognition, and more particularly, a language learning method based on image recognition, an electronic device executing the method, and a storage medium storing the method program files.

There have been some software packages and applications to assist with language learning. For example, some applications can mimic human pronunciation, display images, and present words and sentences to help children learn and memorize vocabulary. However, in the learning of nouns with regard to scenes and objects having similar shapes or forms, children's understanding may differ from each other. It is time-consuming for children to determine the meaning of words by matching the pronunciation with corresponding object images.

SUMMARY

The disclosure provides a language learning method based on image recognition. The method can also be used to evaluate the effect of language learning, thus further improving the learning effect.

The proposed language learning method based on image recognition comprises task feedback and image check; the task feedback comprising playing, by a sound module according to a learning instruction, a vocal content of a word in a second language, and taking, by a user, an object image corresponding to the word through a camera module of a terminal device; and the image check comprising receiving, by a processor module, the object image, identifying the object image according to a pre-established identification model, acquiring an identification result and comparing the identification result with the word, judging whether the object image taken by the user is correct, and feeding back, by a display module or the sound module, a judgment result to the user.

In a class of this embodiment, the method further comprises establishing the identification model prior to the task feedback; establishing the identification model comprising acquiring a plurality of object images corresponding to a plurality of words in different light from various angles, learning and training by a convolutional neural network algorithm, establishing the identification model of the plurality of words corresponding to the plurality of object images, and storing the identification model into the terminal device or a cloud storage module.

In a class of this embodiment, establishing the identification model of the plurality of words corresponding to the plurality of object images comprises graying each object image, extracting the features of each object image, extracting a standard template by recognition training, and creating a standard feature library.

In a class of this embodiment, the plurality of object images for each word comprise a plurality of standard templates.

In a class of this embodiment, graying each object image comprises processing objects in each object image into a uniform specification by centroid alignment, linear interpolation, and enlargement.

In a class of this embodiment, for task feedback, the vocal content of the word, and the vocal content of an example sentence comprising the word are replayed through a sound-playing module according to a user's request.

In a class of this embodiment, the task feedback further comprises receiving the object image taken by the user with the camera module of the terminal device; if no object image is uploaded during a set period of time after the user acquires the learning instruction to take an object image corresponding to the word, then vocal content corresponding to the word in a first language is fed back to the user.

In a class of this embodiment, during the image check, if the learning instruction to take an object image is completed correctly by the user, then an award is fed back through a display or sound-playing module of the terminal device. If the learning instruction to take an object image is completed incorrectly by the user, then the correct image of the object corresponding to the word is fed back, and/or the user is prompted to take an image again to complete the learning instruction.

The disclosure also provides an electronic device, which can effectively check the effects of language learning and assist in language learning.

An electronic device is provided, comprising a memory, processor, and a computer program stored in the memory and executed by the processor. When the processor executes the computer program, a language learning method based on the image recognition of the disclosure is implemented.

Another objective of the disclosure is to provide a storage medium that can effectively check the effect of language learning and better assist in language learning.

Further provided is a computer-readable storage medium comprising a computer program. The computer program comprises the language learning method of the disclosure. When executed by a processor, the computer program executes the language learning method based on image recognition of the disclosure.

The following advantages are associated with the proposed language learning method:

Using the language learning method based on image recognition, the electronic device, and the storage medium in the disclosure, an object-photographing interface is displayed while the vocal content of a word in a second language is fed back. An image of the object taken by the user is compared with a preestablished identification model to judge whether the image of the object taken by the user and the word corresponds to the same object. Thus, this method can check the effects of language learning and provide better assistance in language learning.

BRIEF DESCRIPTION OF THE DRAWINGS

The disclosure is described herein below with reference to accompanying drawings, in which the sole FIGURE is a flowchart of a language learning method based on image recognition according to one embodiment of the disclosure.

DETAILED DESCRIPTION

To further illustrate, embodiments detailing a language learning method based on image recognition, an electronic device executing the method and a storage medium storing the method program files are described below. It should be noted that the following embodiments are intended to describe and not to limit the disclosure.

Example 1

The language learning method based on image recognition, as shown in FIG. 1, comprises:

S0: establishment of an identification model: acquiring a plurality of object images corresponding to a plurality of words in different light from various angles, learning and training using a convolutional neural network algorithm, establishing the identification model of the plurality of words corresponding to the plurality of object images, and storing the identification model in the terminal device or a cloud storage module.

S1: task feedback: playing (using a sound module according to a learning instruction) the vocal content of a word in a second language; and the user taking an object image corresponding to the word through the camera module of a terminal device.

S2: image check: receiving, by a processor module, the object image; identifying the object image according to a preestablished identification model; acquiring an identification result and comparing the identification result with the word; judging whether the object image taken by the user is correct; and feeding back, by a display module or the sound module, a judgment result to the user.

In this example, the user is prompted to complete the learning instruction to take an object image by playing the vocal content of a word. Image recognition is used to judge whether the object image taken by the user is correct to detect the effect of learning. This process can correct a user's misunderstanding during word learning in time. An interesting object-photographing task can help the user to better learn a second language. Even for young children, this is a better way to learn their native tongue.

For English learning and guidance, by playing the vocal content of words and example sentences corresponding to objects in various classified scenes, the method helps users (mainly children) learn a second language by listening to the vocal content and identifying a corresponding object. Taking an image according to the vocal content, this method can check the effect of learning and help children strengthen their memory.

First, in order to be able to identify images subsequently uploaded by the user according to the learning instruction, it is necessary to establish an identification model for objects corresponding to all words that the system provides in order to check the effect of learning. For example, if words that the system provides to check the effect of learning are mostly nouns such as objects, food, animals, and plants, then pictures of various objects, food, animals, and plants corresponding to these words, which are taken in different light from various angles, are acquired over the Internet and then learned and trained by the convolutional neural network algorithm to establish an identification model. The identification model is established as follows:

1. First, the image is grayed to improve the processing efficiency of the server. The weighted averaging formula for the graying is as follows:

$$f(i,j)=0.30R(i,j)+0.59G(i,j)+0.11B(i,j)$$

where i and j represent the position of a pixel in the two-dimensional space vector, that is, the i-th row and j-th column. According to this formula, the gray value of each pixel in each image is calculated, ranging from 0 to 255, so that the image is black, white, and gray. In addition, in order to solve the problems of positional deviation, different sizes, and indefinite rotation of objects in the picture, it is necessary to process the objects in the image into a uniform specification by centroid alignment, linear interpolation, and enlargement to facilitate subsequent matching. Centroid alignment, linear interpolation, and enlargement are existing mature image processing technologies that will not be explained here.

2. After graying is completed, the features are extracted from the image. A feature vector of a certain dimension is extracted from all images of an object corresponding to a word, thereby improving the storage capacity and computation speed of object matching and identification. Because each object has many features, correct identification can only be achieved by selecting the appropriate features. In this example, an image of an object is divided into M×N grids according to the combination and arrangement of features such as color, texture, pattern, shape, transparency, etc., of the spatial density of various objects, and the ratio of the number of pixels in each grid to the total pixels of the object to obtain an M×N-dimensional feature vector. The values of M and N are set according to actual needs.

3. Finally, by identification training, standard templates are extracted from the images of each object in the training set, and a standard feature library is established (that is, an identification model). There are hundreds of standard templates for each object. After feature extraction, the feature vectors of the objects in the training set are stored in a file; the correct value of each object must be specified during training. After the above aforementioned operations are completed, each word in the system word database corresponds to an identification model comprising multiple standard templates. Subsequently, when the user uploads an image taken according to the learning instruction, it is only necessary to compare the image with the identification model to determine whether the image taken by the user matches the word.

Later, when the user checks the effect of language learning, the system first displays, by a user terminal, multiple classified learning scenes comprising animals, plants, food, cars, etc., for the user to choose. Each scene involves word-learning check tasks for multiple objects. The system classifies, in advance, the words provided to check the effect of learning. The method is convenient for the user to learn in a targeted manner. After acquiring a scene selection learning instruction selected by the user, all word tasks of the scene corresponding to the learning instruction will be fed back in order or randomly so that the user can sequentially complete the learning instruction to check the effect of word learning. The vocal content of a certain word in a second language in the scene is played by the user terminal; at the same time, an interactive interface for the object-photographing upload task is displayed for the user to view. The user is prompted to take and submit an image of the object described by the corresponding vocal content. In addition, considering that the user may not understand the meaning of the word after listening to the vocal content once, the task interface also comprises a voice replay button. After the user clicks the replay button, the system feeds back the vocal content of the word and the vocal content of the example sentence corresponding to the word, and plays the vocal content of the word and the example sentence again. The vocal content of the example sentence corresponding to the word is played 1 to 3 seconds after playing the word. If the user spends a long time on the object-photographing interface, for example, when no other operations are performed in 3 to 5 seconds after the example sentence is played, then a corresponding vocal content in the first language is played to prompt the user. This is convenient for the user to determine the meaning of the word. In the disclosure, the second language is the target language the user wants to learn, and the first language is the native language of the user.

After the user uploads the image taken according to the learning instruction, the system acquires the image submitted by the user and recognizes the image using the preestablished identification model to judge whether the object in the image is correct. If it is correct, then the system provides an award; if it is incorrect, then the system displays the correct image of the object for the user and prompts the user to take an image again to complete the learning instruction. It should be noted that, for an image uploaded by the user by mistake, if the system finds that the image corresponds to another word in the system, then it can feed back the word corresponding to the incorrect image at the same time. In addition, in order to make English learning in this method interesting, users, especially children, are encouraged to perform language learning tests. Each word comprises 3 object-photographing tasks. Successfully taking and uploading images multiple times on the same day will be considered as one object-photographing task, and the user will receive a star once he/she completes one task. The user then tries the next voice playback and object-photography task in this scene. A comparison with the identification model is performed specifically as follows:

1. The user clicks the camera button after framing the image in the viewfinder of the user terminal to take and submit an image of the object. The system acquires the image of the object submitted by the user, grays the photo, and processes the images of the objects in the scene into a uniform specification by centroid alignment, linear interpolation, and enlargement to facilitate matching.

2. Features are extracted from the image of the object, and the type of object in the image is identified by comparison with the preestablished identification model to judge whether the object in the image is correct according to the identification result. During identification, similar to the establishment of the identification model, the image of the object is divided into M×N grids according to the combination and arrangement of features such as color, texture, pattern, shape, transparency, etc., of the spatial density of various objects, and the ratio of the number of pixels in each grid to the total pixels of the object to obtain an M×N-dimensional feature vector. The extracted feature vector is compared with the feature vector of each object type contained in the identification model to determine the type of object in the image. The type of identified object is compared with the object type in the task to determine whether the learning instruction is completed correctly.

3. The system judges whether this task wins a star when the user completes the learning instruction correctly. If the object is correct, then the system provides a star and starts the next voice playback and object-photographing task. If the object is incorrect, then the system displays the correct image of the object for the user, returns to the task interface, plays the vocal content again, and prompts the user to take an image again to complete the learning instruction.

Using the language learning method based on image recognition in this example, an object-photographing interface is displayed while the vocal content of a word is fed back. An image of the object taken by the user is compared with a preestablished identification model to judge whether the image of the object taken by the user and the word corresponds to the same object. Thus, this method can check the effects of language learning and provide better assistance in language learning.

Example 2

The second example discloses an electronic device. The electronic device comprises a processor, memory, and program. There may be one or more processors and memories. The program is stored in memory and executed by the processor. When the processor executes the computer program, the language learning method based on image recognition in Example 1 is implemented. The electronic device may be a series of electronic devices such as mobile phones, desktop computers, and tablet computers.

Example 3

The third example discloses a computer-readable storage medium. The storage medium is used to store a program that, when executed by a processor, performs the language learning method based on image recognition in Example 1.

It will be obvious to those skilled in the art that changes and modifications may be made, and therefore, the aim in the appended claims is to cover all such changes and modifications.

What is claimed is:
1. A method, comprising:
    playing, by a sound module according to a learning instruction, a vocal content of a word in a second language;
    prompting a user to take an object image corresponding to the word through a camera module of a terminal device and upload the object image;
    if the object image is uploaded:
        receiving, by a processor module, the object image;
        identifying the object image according to identification model having standard features for the word, by extracting features from the object image and comparing the extracted features from the object image with the standard features for the word; and judging whether the object image taken by the user is correct;
        if the object image taken by the user is correct, feeding back an award to the user by a display module or the sound module; and
        if the object image taken by the user is incorrect, feeding backing a correct image of an object corresponding to the word to the user, and/or prompting the user to take an image again; and
    if no object image is uploaded during a set period of time, feeding back to the user a vocal content corresponding to the word in a first language.
2. The method of claim 1, further comprising establishing the identification model by means of:
    comprising acquiring a plurality of object images corresponding to a plurality of words in different light from various angles;

learning and training by a convolutional neural network algorithm, and establishing the identification model of the plurality of words corresponding to the plurality of object images; and storing the identification model into the terminal device or a cloud storage module.

3. The method of claim 2, wherein establishing the identification model comprises graying each object image, extracting features of each object image, extracting a standard template by recognition training, and creating a standard feature library.

4. The method of claim 3, wherein the plurality of object images for each word comprise a plurality of standard templates.

5. The method of claim 3, wherein graying each object image comprises processing objects in each object image into a uniform specification by centroid alignment, linear interpolation, and enlargement.

6. The method of claim 1, further comprising replaying the vocal content of the word, and the vocal content of an example sentence comprising the word through the sound module according to a user's request.

7. An electronic device, comprising a memory, processor, and computer program stored in the memory and executed by the processor to conduct the method of claim 1; wherein when the processor executes the computer program, the method is implemented.

8. A computer-readable storage medium comprising a computer program for conducting the method of claim 1; when executed by a processor, the computer program performs the method.

* * * * *